May 6, 1969  D. G. WILCOX  3,442,750

REINFORCED SHEET MATERIAL

Filed Aug. 7, 1964

INVENTOR.
D. GIFFORD WILCOX
BY Philip D. Golrick
ATT'Y

United States Patent Office 3,442,750
Patented May 6, 1969

3,442,750
REINFORCED SHEET MATERIAL
De Witt Gifford Wilcox, Tallmadge, Ohio, assignor to The Cleveland Fabricating Company, Inc., Cleveland, Ohio, a corporation of Ohio
Filed Aug. 7, 1964, Ser. No. 388,218
Int. Cl. B32b *15/20, 29/00, 33/00*
U.S. Cl. 161—57                                6 Claims

ABSTRACT OF THE DISCLOSURE

A reinforcing sheet material and method of making the same, having a supporting element and a web-like reinforcing element. The reinforcing element including a first set of spaced strands and a second set of spaced strands disposed in overlying angled relationship with respect to the strands of the first set and an adhesive material disposed on the strands of one of the sets for bonding the strands of both of the sets together at their points of cross-over and for bonding the web-like reinforcing element to the supporting element.

---

The present invention pertains generally to the manufacture of sheet material, and more particularly to improvements in a method of fabricating a reinforced sheet material and the product thereof, and especially to a laminated sheet material which is reinforced.

Although the invention is described specifically with respect to an aluminum metal foil and kraft laminate or laminated structure reinforced by a glass scrim, it is to be understood that the invention in at least certain aspects has advantages with respect to other reinforced sheet materials and other types of reinforcement.

By way of example of prior art practices and structures, it is noted that hitherto metal foils have been laminated to other sheet materials such as plastic or paper sheets for use as a laminated structure for various purposes and environments. However, it has often been found desirable that such laminated structures be reinforced to withstand greater tensile stresses such as might arise by tensile forces applied either directly in the plane of the sheet or laminate or under certain circumstances from pressures applied or components of pressure directed more or less perpendicularly to the sheet, which being at least in some manner secured at points or areas on opposite sides of the pressure application, tends to rupture because of tensile stresses developed therein. Metal foil or plastic film and kraft paper laminates for example, used for packaging purposes or as the facing or vapor barrier sheet in building insulation have therefore been reinforced by the inclusion of a scrim material in the laminated structure between the metal foil and kraft paper. Kraft sheets also have been laminated with reinforcing therebetween. Although various types of scrim have been so used, there is in widespread use today particularly in the facing sheet for building insulation a fiber glass type of reinforcement usually non-woven scrim comprised of one set of more or less parallel longitudinal threads or strands of fiber glass and a second set of similar parallel strands or threads at right angles thereto. In material so reinforced the desirable result is achieved that for given gauges or weights of foil and paper a higher stress can be sustained or for a given stress to be withstood lighter gauges of the foil and/or kraft paper may be used.

A scrim material now widely used and commercially available, and which further is particularly useful or preferred for use with the present invention is comprised of two sets of spaced generally parallel strands or threads of fiber glass, with the strands of one set coated or impregnated with a thermoplastic adhesive binder material such as asphalt or polyethylene running at right angles to those of the other set with the strands secured into a reticulated open form (usually in half-inch or smaller squares) at the crossing points by a bond of the thermoplastic material which has spread or bridged from the coated to the uncoated fiber while the binder is in heated thermoplastic condition. Generally where polyethylene or a like adhesive is used both sets of strands are coated, in contrast with asphalt and the like usually applied to only one set.

Such reinforcement is particularly of value where the sheet material may be subjected to relatively high stresses as for example in multiwall bags or adhesive tapes under use, in wrapping objects or packages, in stretching sheet-backed insulation material for proper lay up, or for example in wrapping the sheeting about insulated ducts, piping or conduits where stretching or straightening forces are applied not only circumferentially around the pipe but also longitudinally to obtain a neat appearance as well as a smooth and effective joint.

The present invention has as principal objects the provision of a structure in reinforced sheet material, especially laminated material including reinforcement, which has the advantage that it may be produced by a method generally involving lower cost than prior similar structures; and which further for the intended purposes has certain advantages in the durability achieved with given gauges or weights of the materials laminated or, conversely for a certain level of durability, may use lighter or lower cost materials going into the laminated structure. Another object is the provision of a method for fabrication of a reinforced sheet material, particularly useful in producing a scrim-reinforced laminated sheet material.

These advantages or results are obtained for example by first laminating say an aluminum foil and a kraft paper by standard and well known procedures and equipment bonded together with any of the adhesives hitherto known or found useable for the purpose. Thereafter, a fiber glass scrim material of a type commonly known is applied to the exposed paper face of the kraft by passing the foil-kraft laminate with the scrim between an opposed pair of moderate pressure rolls with the scrim binder heated at least to a plastic or tacky state. Thus one pressure roll engaging the scrim can be heated to a temperature sufficient to melt the aforesaid asphalt or other thermoplastic binder thereby causing the scrim binder to adhere to the kraft paper surface so that upon cooling and hardening thereof the scrim is effectively bonded to the kraft. In this procedure of course the strands of the scrim are oriented respectively longitudinally and transversely to the sheet for ordinary uses, or more generally with one set disposed parallel to the direction in which principal tensile forces are expected to arise in the environment of actual use of the material.

In this manner for example, commercially available foil-kraft laminate sheet and commercially available scrim may be simply brought together to achieve the desired final reinforced structure, although of course, the entire structure could be fabricated in one continuous method involving simultaneously operating apparatus wherein the foil and kraft are laminated and at a subsequent station brought and bonded together with the scrim, or where the scrim itself is being manufactured and at a subsequent station brought together either with the foil-kraft laminate manufactured at another point of fabrication in the apparatus or simply supplied as the ready made laminate.

Generally it has been found that this mode of fabrication in contrast with bringing the reinforcing scrim between foil and kraft paper as the latter are laminated can proceed with simpler equipment, lower cost equipment, and with fewer problems in control of the materials being brought together and for the attainment of a uniform satisfactory product.

Moreover, it has been found that for the vast majority of applications for the reinforced foil-kraft composite the lower cost structure obtained by the present invention has a more than adequate adherence of the scrim to the kraft without its inclusion between the foil and paper sheets.

Further it has been found that placement of the reinforcing scrim on the side of the kraft opposite the foil has the advantage that in the finished reinforced sheet material there may be avoided the hitherto present and disadvantageous scrim pattern appearing in the foil itself, that is ridging or elevation of the foil locally over the strands of the scrim which in the prior art foil-scrim-kraft materials resulted in frequent penetration or breaking of the foil by abrasion or scratching on the elevated lines or regions. Particularly where such reinforced material includes the metal foil primarily to provide a vapor barrier as in certain packaging applications or in insulated pipe or duct wrappings or in insulation blanket facings for building installations, this result of the prior structure is particularly desirable since even small scratching or abrasion which interrupts the foil continuity proportionately destroys the effectiveness of the material for blocking vapor transmission, even where the wear, perforation, or damage is so slight as to be unobservable or insignificant for esthetic or appearance considerations.

Thus for many applications by the present invention it is possible to use a considerably lighter foil gauge than would otherwise be necessary to withstand either the wear and tear on the foil involved in manufacture, handling, storage, shipping or in installation or application at the point of use, as well as wear which may occur at or in the environment of use. Moreover, even where it is desired to include the reinforcement between two sheets, for example between the kraft faces of two sheets, certain features of the present invention are advantageous insofar as the sheets are secured together by the scrim or other reinforcement without use of adhesive to achieve a degree of bonding directly between the sheets.

Other objects and advantages will appear from the following description and the drawings wherein.

Figure 2:
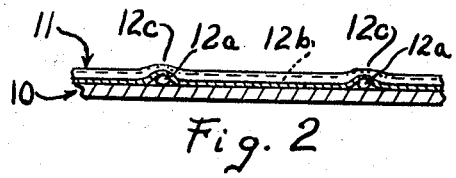
FIG. 2 is a cross section taken as indicated by the line 2—2 in FIG. 1.
Figure 5:
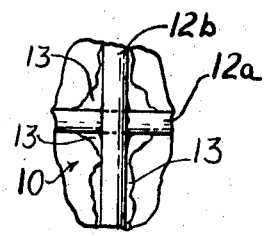
Figure 3:
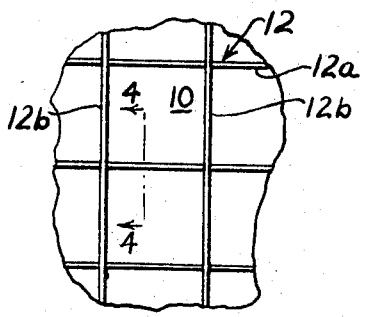
FIG. 3 is an enlarged fragmentary view of the kraft paper side of a foil-kraft laminate with the scrim applied thereto in accordance with the present invention.
Figure 6:
Figure 7:
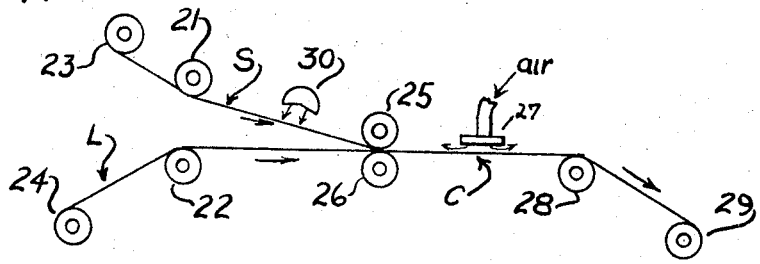

FIG. 5 is a fragmentary much enlarged view of a scrim strand cross over region from FIG. 3; and FIG. 6 is an enlarged fragmentary sectional view similar to FIG. 2 but showing application of certain features of the invention to reinforced sheet structure with reinforcement between two sheets; and FIG. 7 shows by a diagrammatic representation of apparatus one mode of carrying out the method for fabricating reinforced laminated material in accordance with the present invention.

Figure 1:
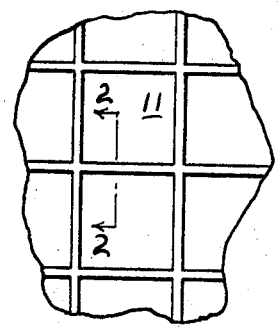
FIG. 1 is a view showing the foil side of a foil-scrim-kraft reinforced laminated structure of the prior art.

In FIGS. 1 and 2 there is shown a typical structure in a prior art reinforced laminated material, of a foil-scrim-kraft paper type, comprised of a kraft paper sheet 10 and an aluminum foil sheet 11 between which is sandwiched a fiber glass scrim comprised of two right angle disposed sets having respective parallel strands designated 12a, 12b. The major face-to-face area of the kraft and foil are bonded directly together by a suitable adhesive (not shown) generally applied to the face of a foil web or sheet as it is moving from a supply roll to the point where it is brought into face-to-face laminating relation with the foil web and the scrim web coming therebetween. The paper and foil are generally distorted and pressed towards each other in the more or less square open areas between the scrim strands, the adhesive also in some degree surrounding scrim fibers and bonding the same to the kraft and to the foil.

Being ductile and of lighter gauge, primarily the foil is the material which is distorted about the scrim strands toward the paper as is more clearly seen by the sectional view of FIG. 2; the foil side of the composite sheet material then displaying the outline of the sandwiched scrim as indicated by the plan view of the foil side as shown in FIG. 1. In these figures it is clearly seen that the lines or regions of the scrim configuration raised in the foil present lines or ridges on which any impinging objects will primarily bear, thereby applying a high foil disrupting or abrading force or pressure locally in these regions, excepting of course for impinging sharp pointed objects of point dimensions less than the spacing of the scrim fibers, which could of course come to bear on and penetrate the regions of the composite between the strands. Although the scrim strands at the cross-over points tend to flatten somewhat so that the total thickness of the scrim, hence the raising of the foil, at such points is less than the sum of the nominal diameters of the scrim strands, nonetheless at the cross over points there is a still further elevation of the foil as indicated in 12c in FIG. 2.

This then means that small areas of the foil corresponding to the crests in the foil ribs or corrugations caused by the underlying scrim are particularly subject to wear abrasion and hence disruption of the foil continuity, diminishing its effectiveness for vapor barrier purposes with further points 12c particularly subject to wear or abrasion. Though perhaps these exposed or vulnerable areas represent a small percentage of the total foil area, insofar as foil interruption or perforation is concerned they do present such opportunities for penetration as will greatly increase the holes, or hole area of the foil over the rating or figure of merit of this characteristic of the original foil material by the time the sheet material is in its final environment; and likewise for a quicker deterioration of this characteristic of the foil during the life of the installation or application in environment of use.

Figure 4:
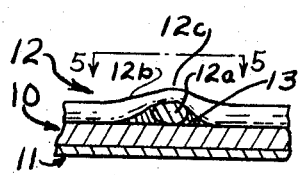
FIG. 4 is a fragmentary irregular sectional view taken along the line 4—4 in FIG. 3.

In FIGS. 3, 4 and 5 are shown fragmentary detailed views representing the structural product in accordance with the present invention, wherein similar reference numerals are used for elements analogous to those of FIGS. 1 and 2. Here in contrast with FIG. 1 the aluminum foil 11 and kraft paper sheet 10 are laminated or bonded directly to each other (again the adhesive not being shown) by any suitable adhesive of which many are known to prior art for this purpose; and the scrim web 12 is secured in the hereinafter described manner to the exposed face or surface of the kraft paper web or sheet. Here the strands 12b of the scrim web, appearing as running vertically in FIG. 3, represent a set of strands in the scrim web which in its manufacture are first coated or penetrated with a thermoplastic adhesive 13, such as asphalt, these strands overlaying and extending at right angles to an uncoated set of strands 12a running horizontally in FIG. 3. In this preferred right angle disposition, the strands of course are joined to each other at the cross-over points by the adhesive 13 which has flowed down from the impregnated strands 12b into and around the uncoated strands 12a immediately adjacent the cross-over points, so to secure them together as ordinarily occurs in commercially available scrim of this type. Moreover, by virtue of the method of fabrication to be described, the asphalt or other thermoplastic adhesive on the strands 12b has, while in a heated condition, wetted adjacent kraft areas underlying and surrounding both the coated strands 12b where they come into proximity or actual contact with the kraft, and also the strands 12a at the crossover regions in similar fashion.

In the structure, the thermoplastic adhesive originally carried by the strands 12b thus wets and forms a bond not only substantially along the entire length directly underneath and to each side of each coated fiber 12b, as the adhesive in plastic or fluent condition has wet the kraft paper but also at the cross-over points directly under the originally undercoated unimpregnated fibers 12a, and for a short length of the latter on either side of a cross-over point, thus bonding strands 12a immediately underneath and to each side in similar fashion directly to the kraft paper (see FIG. 5). Hence further as the fibers 12b pass over the fibers 12a, the latter are not only adhesively bound at the cross-over points or regions to the kraft but also are mechanically bound thereto by the fibers 12b.

This structure permits fabrication by a method as hereinafter described which easily achieves a final product where the foil is not objectionably or in any deleterious degree elevated locally corresponding to the location of the scrim strands. On the other hand, even in cases where for a desired patterned appearance in the foil as an external layer may be desired despite the entailed disadvantage of a degree of vulnerability to foil penetration and vapor barrier destruction roughly proportionate to the prominence of the pattern, this also can be achieved with this structure while yet retaining decided fabrication cost advantages arising from the use of the method thereby permitted.

In FIG. 6, there is shown for example a kraft-scrim-kraft structure wherein the reinforcement is actually sandwiched between two sheets, as another application utilizing some of the advantages of the invention, kraft webs or sheets 10, 10a having the scrim web 12 located therebetween. Here scrim 12 is secured to kraft 10 by adhesive bonds as previously described relative to FIGS. 4 and 5; and on the composite 10–12, the kraft 10a may be either similarly bonded by the scrim binder itself or by a separate adhesive. In the former case, the total structure has the advantage of the low cost achieved by utilizing the scrim binder as the sole adhesive and the simplicity of fabrication; while in the second case, methodwise, the use of the kraft-scrim structure 10–12 as a transitory structure first fabricated onto which the kraft 10a is subsequently applied with a distinct adhesive, frequently simplifies the handling of the webs in manufacture of the final product.

In FIG. 7 the characterizing and essential step for fabrication of the product in accordance with the present invention is shown wherein a scrim web S, of the type described in detail with respect to FIGS. 3, 4, and 5 and an adhesively bonded foil-kraft paper laminate web L, are passed over the respective guide supply sources over guide rolls 21 and 22, the sources being either previous portions of the apparatus where one or the other of the two webs is being continually fabricated from its known constituents by standard or well-known procedures in apparatus, or as shown here from respective scrim supply roll 23 and foil-kraft laminate supply roll 24, rolls 21, 22 to enter between the opposed upper and lower pressure rolls 25, 26. The adhesive is so heated as to be in a very tacky or melting state at the time the roll pressure is applied, for example, by radiant heating means 30, or by having one of the rolls 25, 26, say upper roll 25 coming in contact with the scrim, heated to melt the thermoplastic adhesive.

Thus, the asphalt of the scrim fibers 12b, as the scrim is pressed into contact with the bare kraft paper face of the laminate, is molten and brought into wetting contact with the kraft paper, or at least softened to a readily adherent tacky condition. To avoid asphalt build up, the roll 25 is best sheathed with Teflon or coated with a silicone release material. The composite web issuing from between the rolls 25, 26, in traveling toward the guide roll 28 over which it passes to the windup roll 29, has an opportunity for cooling to solidify the thermoplastic scrim adhesive thereby securing the scrim in the composite.

Preferably immediately after the pressure rolls 25, 26, particularly for higher speed operations, there is placed some means such as an air blast nozzle or distributing plate 27, or there is used a water cooled roll 28 to accelerate the cooling and solidification of the scrim adhesive. Before the pressure rolls, heating roll may be used to preheat the composite web L as may be advantageous again where high web speeds are desired; and for this purpose the guide roll 22 could serve, in conjunction with the radiant heater 30. The take-up or winding roll 29 usually of course is a primary driving roll, but the arrangements among the several rolls for driving or speed control will be apparent to those skilled in the art of handling continuous webs in the laminating or analogous web handling process.

Essentially the same process and type of apparatus can be used in manufacture of a FIG. 6 type product, wherein the scrim binder alone is used as the adhesive securing both sheets 10, 10a, with roll 24 as the supply roll for kraft sheet 10, and an additional supply and guide rolls to feed the sheet 10a above heater 30 to and between the pressure rolls 25, 26 along with the lower webs S and 10. Where a FIG. 6 type product is produced with the sheet 10a secured by an additional or a different type adhesive, then the process first described relative to FIG. 7 may be used to produce a transitory or intermediate product, say of kraft and scrim, or foil-kraft laminate and scrim. To the intermediate product is then bonded the second sheet or web 10a at a point beyond the cooling means (e.g. 27 or 28) by applying the further adhesive either to the scrim side of the intermediate or to the web 10a and bringing the intermediate product and the web 10a through further laminating pressure rolls.

I claim:

1. A durable, lightweight, reinforced sheet material having heat and vapor barrier insulating characteristics comprising, a heat insulating support sheet and a relatively thin vapor barrier sheet secured to one side of said heat insulating support sheet, a non-woven, scrim web secured to said heat insulating support sheet on the side opposite said vapor barrier sheet and providing a reinforcement therefor, said scrim web including an inner set of laterally spaced strands secured at spaced points directly to said heat insulating support sheet on the side opposite said vapor barrier sheet and an outer set of laterally spaced strands extending generally transversely of and in engaged cross-over relation on said inner set of strands on the side opposite said vapor barrier sheet, an adhesive material disposed in coated relation on the strands of said outer set and extending substantially continuously for the full length of said strands, said adhesive coating acting to bond the strands of said outer set substantially throughout their length to said heat insulating support sheet and also to bond the strands of said outer set to the strands of said inner set adjacent their respective points of contact and to bond the strands of said inner set adjacent such points of contact to said heat insulating support sheet, the portions of each of the strands of the inner set which extend between adjacent strands of the outer set are unattached to the heat insulating support sheet thereby to provide generally free movement of the strand portions of the inner set with respect to the strands of the outer set upon flexure of the sheet material.

2. A reinforced sheet material in accordance with claim 1, wherein said heat insulating support sheet comprises paper, and wherein said vapor barrier sheet comprises a metallic foil.

3. A reinforced sheet material in accordance with claim 2, wherein said paper and metallic foil are bonded together in the form of a laminate.

4. A reinforced sheet material in accordance with claim 2, wherein said metallic foil is aluminum.

5. A reinforced sheet material in accordance with claim 1, wherein the strands of said inner and outer sets are comprised of fiber glass, and wherein said adhesive coating is a thermoplastic material.

6. A reinforced sheet material in accordance with claim 1, wherein said adhesive coating is disposed directly beneath and laterally to opposed sides of each of the strands of said outer set on said heat insulating support sheet, and said adhesive coating adjacent said cross-over point being disposed substantially directly beneath the strands of said inner set and for a relatively short length thereof on opposed sides of said cross-over point on said heat insulating support sheet.

References Cited

UNITED STATES PATENTS

| | | | |
|---|---|---|---|
| 1,285,465 | 11/1918 | Tewksbury | 161—57 |
| 1,611,031 | 12/1926 | Henderson. | |
| 2,719,804 | 10/1955 | Carlson | 156—178 |
| 2,739,092 | 3/1956 | Stevenson | 161—57 |
| 3,068,135 | 12/1962 | Bower | 161—143 |
| 2,028,670 | 1/1936 | Hosking | 161—148 X |
| 2,620,851 | 12/1952 | Brown | 161—84 X |
| 2,902,395 | 9/1959 | Hirschy et al. | 156—179 X |
| 3,057,539 | 10/1962 | Leary | 156—179 |
| 3,219,504 | 11/1965 | Rosler | 161—84 |

MORRIS SUSSMAN, *Primary Examiner.*

U.S. Cl. X.R.

156—178; 161—143, 146